Oct. 15, 1957 W. E. McFARLAND 2,810,079
AUTOMATIC STARTING SYSTEM FOR ENGINE-GENERATOR PLANTS
Filed Jan. 18, 1956 5 Sheets-Sheet 1

FIG. 1

CORE AREA 0.168 SQ. IN.
FIG. 2

FIG. 3

CORE AREA 0.063 SQ. IN
FIG. 4

WILLIAM E. McFARLAND
INVENTOR.
BY
Attorney

Oct. 15, 1957 W. E. McFARLAND 2,810,079
AUTOMATIC STARTING SYSTEM FOR ENGINE-GENERATOR PLANTS
Filed Jan. 18, 1956 5 Sheets-Sheet 2

WILLIAM E. McFARLAND
INVENTOR.

Oct. 15, 1957   W. E. McFARLAND   2,810,079
AUTOMATIC STARTING SYSTEM FOR ENGINE-GENERATOR PLANTS
Filed Jan. 18, 1956   5 Sheets-Sheet 3

FIG 14

WILLIAM E. McFARLAND
INVENTOR.
BY Peter J. Taylor
Attorney

Oct. 15, 1957   W. E. McFARLAND   2,810,079
AUTOMATIC STARTING SYSTEM FOR ENGINE-GENERATOR PLANTS
Filed Jan. 18, 1956   5 Sheets-Sheet 4

FIG.15

WILLIAM E. McFARLAND
INVENTOR.

Oct. 15, 1957  W. E. McFARLAND  2,810,079
AUTOMATIC STARTING SYSTEM FOR ENGINE-GENERATOR PLANTS
Filed Jan. 18, 1956  5 Sheets-Sheet 5

WILLIAM E. McFARLAND
INVENTOR.

BY *[signature]*
*attorney*

United States Patent Office 2,810,079
Patented Oct. 15, 1957

2,810,079

AUTOMATIC STARTING SYSTEM FOR ENGINE-GENERATOR PLANTS

William E. McFarland, Nutley, N. J.

Application January 18, 1956, Serial No. 559,860

9 Claims. (Cl. 290—30)

This invention falls in the field of automatic load-responsive controls for small A. C. engine-generator sets (electric plants) of the kind having a storage battery for cranking the engine. More particularly the invention relates to an improved load relay system which is necessarily the heart of the automatic load-responsive control system employed.

The purpose of the main relay (load relay) of automatic electric plants is to effect the starting of the engine when any load is put on the line (load circuit) which the plant serves, and to stop the engine when the last load is taken off the line. It would be desirable (but heretofore has been impractical) to have a varied form of control in which the load relay will effect starting of the engine when the first load is put on the line, and effect only a slow-down when the last load is taken off line, with reversion again to normal load speed when the next load is put on the line, rather than involve any stopping of the engine.

In the case of A. C. electric plants, it often is possible to eliminate a separate starter or cranking motor, such as is used in automotive engines, since the exciter system of the plant may be driven as a cranking motor through use of a battery of about 12 to 24 volts. Automatic starting controls, such as discussed herein, however are adaptable to any battery-energized system of cranking. The means for stopping such engines vary with different types of engines, but always are means controllable by a switching operation effected by a load relay. Thus, in diesel engine plants, an electromagnetic fuel shut-off valve is provided, which is controlled by a switching operation of the load relay so that engine fuel is shut off completely when all load is disconnected from the load circuit. In the case of spark ignition type engines, it is simpler to utilize the switching ability of the load relay to cut off the engine ignition when all load is disconnected. Spark ignition type engines for electric plants usually have magnetos, and the common simple method for cutting off ignition is to ground the magneto contacts.

The "automatic starting" type of control for electric plants is much more convenient to use than the so-called "remote starting" type of plant which necessitates the use of remote control wires (separate from the load circuit wires) which are run to that point where control is desired. In addition, the user must close a separate switch in the remote wire circuit to start the engine. In spite of this, more "remote starting" plants than "automatic starting" are sold. This is because the main relay of the "remote starting" type of plant is an inexpensive and rugged relay, whereas, heretofore, the load relay (main relay) of the "automatic starting" type of plant has been both unduly expensive, delicate in operation, and difficult to adjust. It is considered essential that the load relay be highly sensitive to hold the running status of the plant until, for example, the last lamp is turned off in the load circuit which the electric plant serves. A usual standard for small plants, such as a 5 kw. plant, is a load relay which is sensitive enough to hold the running status on a line load as small as 1% of plant capacity.

In the "automatic starting" type of control, the load relay of the system is initially (and strongly) energized by battery current when the load is first connected on the line, which enables the relay to take over the control. After the engine is up to speed, a switching operation occurs after which the necessary energization of the load relay must be derived from the load circuit current flow itself. The basic difficulty of the load relay, therefore, is that it must be a current relay for A. C. operation (which is unfavorable in itself), and that it must be able to hold its operatively energized status over an extreme range. In addition, it is desirable that the relay have exceptionally good pull-in characteristics so that it will not lose control in the event of a momentary interruption in load circuit current flow. Also, it would be desirable that the load relay respond to flow of low frequency current so that one load relay could control an idling device as well as the automatic starting controls.

The difficulties with load relays, heretofore, have been the same as those encountered with wide range A. C. relays for any other purpose. Wide range relays have tended to be inherently delicate, expensive and troublesome devices. The conventional directly-energized load relays, as used heretofore, have large operating coils of heavy wire, and small sensitive armatures which chatter in the energized position. The force for supplying switching contact pressure, therefore, usually is limited to such force as is available from the armature spring, since, due to the chattering, the force of the magnetic pull is practically unavailable. This tends to make for complex arrangement of the several contacts and delicate adjustment to divide the available contact pressure between the several contacts. In such directly energized relay systems, the heat generated in the large coils and the voltage (when carrying full load), approach seriously objectionable limits. Also, it is usually necessary to provide a small auxiliary (shunt coil) A. C. energization of these load relays at such times as the load is on the line, to assist the main coil of the relay in holding the energized status of the relay during the condition of light load circuit current flow. The shunt coil also assists in demagnetizing the core of the load relay when all load is off, since sensitive A. C. relays are built practically without air gap in the magnetic circuit and may not release naturally. Obviously, the shunt energization is a complicating factor in the matter of delicate adjustment, and does not correct the poor performance of the relay with respect to ability to reset the relay armature to the energized position on small line loads.

In the present invention, the prior difficulties are avoided by utilizing a simple and suitably rugged small relay as the load relay. The energization after the engine comes up to speed is through use of a combination of a current transformer of particular design and a rectifier. The resulting "load relay system" provides equal or better sensitivity than heretofore-used directly energized load relays, as well as rugged contact operation, avoidance of excessive heat and voltage losses through the unit, and elimination of delicate adjustment. Furthermore, such units may be made at a much lower cost.

The invention will be more readily understood by reference to the accompanying drawings in which

A somewhat enlarged cross-sectional view lengthwise the core and coil of Figure 3 is depicted in Figure 6. Figure 7 is an end view of the coil bobbin employed in the transformer of Figures 3 and 5, while Figure 8 is a plan view of a partially formed laminated core used in the transformer of Figure 3. A side view of a load relay system of the present invention devoid of necessary wiring is presented in Figure 9 for which a circuit diagram is depicted in Figure 11. Figures 12 and 13 illustrate side views of suitable types of relays for use as additional elements in the control system.

Figure 16 shows a modification of a portion of the circuit diagram shown in Figure 15, while

One necessary element of the load relay system of the present invention is a current transformer of particular design which is operated in a particular manner and which is more fully described in copending application Serial No. 556,277, filed on December 29, 1955, by William E. McFarland. Its core is operated at a relatively large percentage of saturation at even a small minimum flow of current through the load circuit with which the transformer is placed in series. The general characteristics of the design and operation of this transformer will therefore be taken up prior to the subsequent description of the individual drawings which provide details of typical transformers and also illustrate the use of the load relay system of the present invention.

Figure 9:
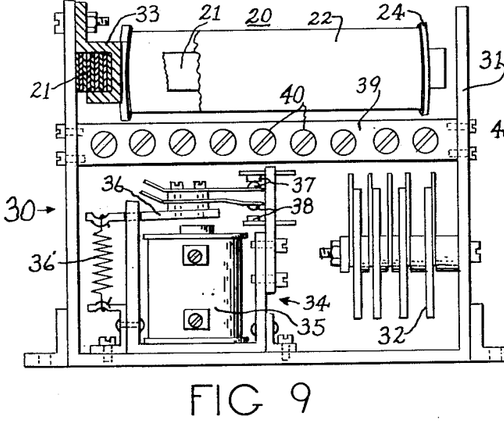
Figures 11, 12, 13:
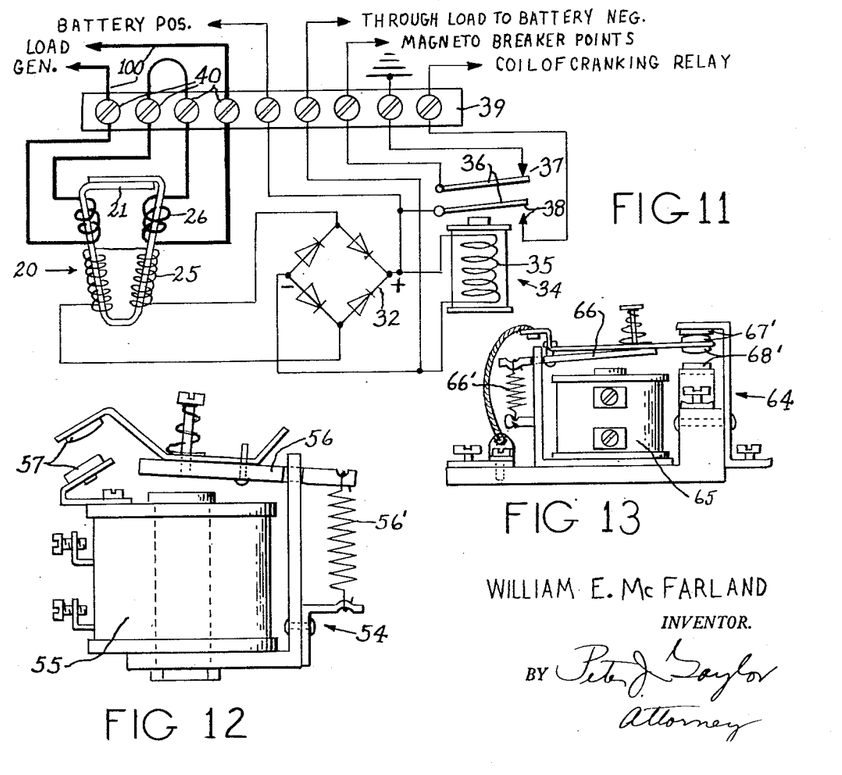

The components of the load relay system are illustrated generally by Figure 9, a typical wiring diagram of which is shown in Figure 11. The current transformer 20 has a primary winding 26 in series with load circuit 100, and the secondary winding 25 furnishes current, through a rectifier 32, to energize the operating coil 35 of the load relay 34. Also, the operating coil 35 is connected with two of the terminals 40 so that it can be battery-energized by current of the same polarity as is taken from the rectifier. From Figure 9 it will be observed that load relay 34 is an ordinary typical D. C. relay with conventional contact operation. Its design requirement is merely that it be sufficiently rugged in contact operation, efficient as energized with pulsating but unipolar current (which will hereafter be termed "pulsating D. C."), and sensitive enough for the purpose intended. The energy requirement for operating relay 34 will not be exactly the same as for operating the same relay on steady D. C. In general, relay 34 can be pulled in with less actual applied wattage in the case of the pulsating current than with steady D. C., particularly under a low frequency condition. Also, since the energization is that of a pulsating current, operating coil 35 represents an impedance value in the circuit served by secondary winding 25 which impedance value is higher than just the actual resistance value of the copper wire used for winding coil 35. It is not desirable nor even practical to smooth out the pulsations, as by a suitably large condenser connected across the operating coil 35. Such a condenser would detract from the efficiency of the transformer at condition of minimum pull-in energization of the load relay, and would draw heavy current from the transformer when the amperage input to the transformer is high, resulting in a high but steady voltage to the operating coil 35, sufficient to damage the coil.

With respect to the requirement of rectifier 32, cost limitations often will be such as to prohibit strictly high-efficiency rectifiers. An ordinary selenium bridge-circuit rectifier, such as that illustrated in Figure 9, is adequately efficient. A typically suitable rectifier for the purpose of the present invention is a commercial selenium rectifier, rated for use at 25 R. M. S. volts and 300 milliampere output. The 300 milliampere capacity is large with respect to the energization requirement of a typical load relay useful herein. This is because, in the system employed herein, the transformer has a distorted wave form with respect to the secondary current, resulting in peak voltages being applied to the rectifier that are considerably higher than the voltage for which the rectifier is rated. Due to the characteristics of the circuit generally, these peak voltages do not damage or cause breakdown of the rectifier. Significant leakage current flows in reverse direction through the rectifier and is due to the peak voltage developed. By using an oversize (but still small) rectifier, the heat generated in the rectifier by leakage current is dissipated without causing damage.

In a rectifier such as a selenium coated unit, the forward resistance varies with variation of current flow through the rectifier. Forward resistance is highest when current flow is small. Thus, it is highest when the output of transformer 20 is smallest. This is adverse to the efficiency of the present system, and tends to make it necessary to work the rectifier toward its safe limit with respect to voltage applied to the rectifier. The varying resistance of the rectifier, together with the pulsating nature of the current, make it difficult to calculate the exact impedance of the circuit comprising the rectifier and the load relay, as well as to calculate the exact output in volt-amperes or watts that is required from the transformer. The requirement, however, can be estimated closely prior to designing the transformer by determining the minimum A. C. voltage (and current) which may be applied at the rectifier to obtain satisfactory pull-in or holding energization of a given type of relay 34.

A typically ordinary relay suitable to serve as load relay 34 is a commercial type of relay having an operating coil about 1" high, and which is generally similar to that illustrated by relay 34. Such a relay will stand two or three watts energization, whereas the energy output of the transformer herein ordinarily will be level within a smaller range. Assuming, for example, the use of a rectifier rated at 25 volts, the relay coil (if of average design) may be, say 300 ohms for 60 cycle operation, or somewhat less, if low frequencies are involved. It may be stated that it is desirable to select the resistance of the relay coil as high as appears practical with respect to safe operation of the rectifier. The transformer and relay coil will be matched in any event. Thus, the higher the resistance chosen for the relay coil, the smaller will be the rectifier loss.

Small electric plants employing the type of controls described herein are practically always 50 to 60 cycle plants, so that 60 cycles will be used herein as the basis of design data. The design of the transformer primary winding necessarily will be such as to pass the load current of the largest size plant for which the particular transformer is contemplated. The transformer may be designed to assure operative energization of the load relay at a suitably small "design minimum" line load condition, while avoiding excessive loss of load voltage or energy at full line load condition. Having established the energy requirement of a given relay to be used as a load relay, it is possible to design the transformer to obtain the necessary operative energization of the relay at a predetermined low point of load circuit flow. But, in practice, it is sufficient to design an efficient transformer which takes only a moderate drop in the load voltage, and then to balance or match up the factors so as to obtain as rugged adjustment of the relay as is consistent with operative energization at design minimum condition.

It would not be practical to use a conventionally designed current transformer for the application herein. Also, it is not practical to operate the current transformer in the conventional manner, that is, with the core operating at a large fraction of saturation only when load circuit flow is at or near maximum. Such conventional practice would result in, say, two or three watts energization of load relay 34 when load circuit current flow is at maximum, but with no significant energization when load circuit current flow is small. This is because, in conventional practice, the volt-ampere input to the transformer is in ratio to the amperage input. There is no remedy to correct the variation in amperage input but it has been found that the transformer can be designed and matched so as always to have a significantly useful voltage input, and thus a useful volt-ampere input, and, moreover, to have such efficiency at the design minimum condition as to convert much of the volt-ampere input into useful energy applied at the rectifier.

Briefly, this is accomplished first by use of core material having low loss and high permeability, especially in the high magnetization range. Next, it is accomplished by the greatest practical restriction of core weight, effected by drastic restriction of core area, which in turn permits an effectively long core affording a long winding space for the primary winding. In addition, it is accomplished with an impedance match between the transformer and the load relay which is made on the basis of working the transformer core as high within the magnetization range as is efficiently practical when current flow in the load circuit is at or near the design minimum flow. Surprisingly, allowances or sacrifices of efficiency are seldom necessary for the purpose of preventing damage to the load relay or the rectifier under condition of maximum current flow in the load circuit.

By using the commercially available better grade core materials and keeping the core with minimum mass, it has been found practical to operate the core at as high as 25% to 50% of saturation, even at design minimum condition, that is, when load circuit flow is only 1% or 2% of maximum flow.

As a first step in design calculations, a suitable high permeability core material may be chosen. As a second step, the core area may be estimated and selected as small as is practical in a transformer. As a third step, the number of primary turns may be estimated and will include sufficient turns to offset core losses together with any air gap losses, magnetizing turn losses and incidental small transformer losses. They would also include sufficient turns to obtain the needed useful volt-ampere input for the transformer which will be converted to secondary output at the rectifier, preferably with still some additional primary turns within the limits of reasonable voltage drop through the primary winding. As a fourth step, the necessary length of core (to accommodate the primary winding) can be estimated and then the possible output of the transformer at various design minimums can be calculated and the design revised, if necessary. As the final step, the secondary winding, which is a small wire winding and can be disregarded in the prior calculations, can be designed with respect to number of selected turns so as to work the transformer core at its most efficient level with respect to operation at the design minimum condition.

It has been found that with respect to the particular type of transformer for a load relay system, that the primary winding should be of the smallest practical size wire, and the winding spread out over practically all of the core length in short turns, such as a single layer winding, even if a slight additional core length is required to accommodate it.

A well known core material that is suitable for the transformer used herein is known as "Hipernic," a nickel-iron alloy containing 45–50% nickel and available in lamination form in thickness of 0.006" to 0.014". One type of this material is sold under the trade name of "High Permeability 49." The following data define the characteristics of said core material:

| Flux Density, Sq. In. | Ampere Turns Required Per Lineal Inch for Flux Density | Core Loss, Watts per Lb. | |
|---|---|---|---|
| | | 0.014" Lam. | 0.006" Lam. |
| 100,000 (Substantial Saturation) | 20 | 1.0 | 1.6 |
| 75,000 | 2 | .55 | .5 |
| 50,000 | .4 | .25 | .15 |
| 25,000 | .16 | .06 | .035 |

Figure 1:
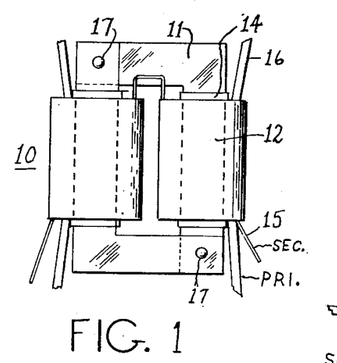
Figure 1 represents a plan view of a transformer just barely suitable for use in the present invention constructed along lines approaching the conventional practice.
Figure 2:
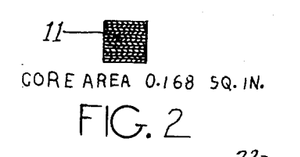
Figure 2 is a cross-sectional view of the core therein.
Figure 3:
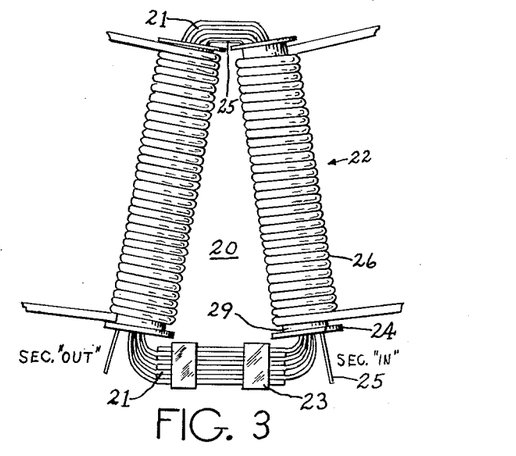
Figure 3 is a similar view of a transformer entirely suitable for use in the present invention, while a cross-sectional view of its core is illustrated in Figure 4.

Referring now to the drawings, Figures 1 and 3 show transformers 10 and 20 respectively, either of which may be used in the present load relay system for small electric plants. Specifications given are based on use of "Hipernic" core material or equal, 60 cycle current, and on the ability of the primary winding to carry at least 25 amperes, as well as avoiding a voltage drop (excluding the drop due strictly to wire resistance) of appreciably over 1 volt. Both transformers are drawn on the same scale. Core 11 of transformer 10 may be assumed to be 2¼" in height. In transformer 10, concession is made in favor of compactness and conventional core construction at the sacrifice of the desirable degree of efficiency for the present application. Thus, the core area of 0.168 square inch as illustrated in Figure 2, is larger than it should be for the present purpose. Rivets 17 tend to avoid shifting of laminations which should butt precisely to avoid any air gap effect. Coils 12 are wound on insulating tubes 14. The primary inding 16 may be #12 wire with 12 turns for each section, or a total of 24 turns, which will limit the maximum voltage drop to approximately 1 volt. One method for determining the number of secondary turns is to select the turns for as large a secondary voltage as it is felt the rectifier will stand. Under this procedure, the final step would be to select the resistance or impedance of the coil of the load relay so as to match the transformer. A 25 volt selenium rectifier will permit the use of 600 turns for the secondary winding 15, which will result in an average or effective output voltage of about 25 volts maximum when operating core 11 at saturation. Assuming that transformer 10 proves highly efficient, the D. C. resistance of the load relay used will be several hundred ohms and, especially considering other factors, secondary winding 15 will feed into a high impedance circuit and it is therefore permissible to use quite small wire for the secondary winding. A resistance of 30 ohms or more for the secondary winding is not a serious factor in the total efficiency of the transformer, serving as a safety factor in protecting the rectifier when any extreme peak voltages may be developed, as during momentary overload conditions.

Figure 4:
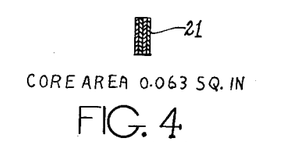

Transformer core 21 of transformer 20 is shown in Figure 4 to have the drastically restricted small rectangle core area of 0.063 square inch, permitting a reduction in the number of laminations so that a core can be formed from plain lamination strips. Core 21 is practically gapless and any gap is nullified because of the large number of primary turns. The small core area permits a more extreme reduction of core weight than in the case of transformer 10, and about a 50% increase in the number of primary winding turns per unit of core length. The Figure 3 transformer is even wasteful of core length to enable the placing of the necessary primary turns in a simple and inexpensive single layer winding. Due especially to the approximately triangular shape, the assembled transformer 20 is sufficiently rigid for mounting. Coil assemblies 22 and core 21 of transformer 20 are low cost, resulting in a substantial saving as compared to that for transformer 10 requiring precise core construction.

Figures 7, 8:
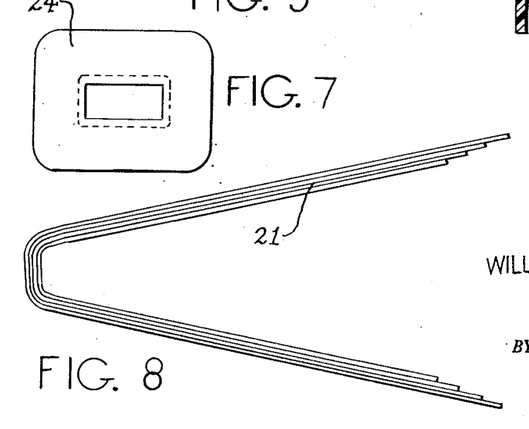

The windings for transformer 20 are shown to be disposed on insulating bobbins 24, an end view of which is shown in Figure 7. A paper or similar insulator 29 separates primary winding 26 from secondary winding 25. Secondary winding 25 may be the inner winding, and 1600 turns thereof will obtain the same 25 volt output as suggested for transformer 10. Since small wire is permissible, and due to the length of winding space, the secondary winding is, say, only 1/16 inch in thickness. About 64 turns of primary winding will result in the same voltage drop (approximately 1 volt) as suggested for the transformer 10. No. 12 wire may be used, for a single layer winding, requiring the bobbins 24 to be near 3" in length. The weight of either transformer will be about ½ lb. Transformer 20 will provide the superior performance in all respects, except that during 25 ampere current flow, the heat loss in the primary winding will be about 10 watts, as compared to, say 5 watts for the transformer 10. The two sections of primary winding in the case of either transformer may be connected in either series or parallel, thus permitting either 25 or 50 ampere capacity, and further modifications such as the use of two transformers in parallel and serving the same rectifier and load relay, may be made to permit one standard transformer design to serve electric plants of varying size.

Figure 8 illustrates the core of transformer 20 as partially formed, ready to receive coil assemblies 22. After slipping the coils on the core, the extending ends of the laminations will be bent over, interleaving one or several layers of lamination at a time, to provide approximately the shape shown in Figure 3. The interleaved ends may be held in close contact by clips 23 as shown, or merely held clamped by a mounting bracket as by bracket 33 of Figure 9. While the view of the core section shown by Figure 4, and core 21, as illustrated in Figures 3 and 8, indicates only 4 individual laminations, there ordinarily will be a dozen or more laminations depending upon the thickness of core material selected.

Figure 5:
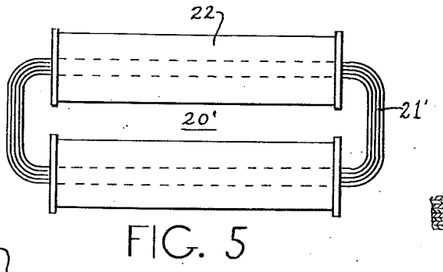
Figure 5 represents a similar view of a modified form of suitable transformer.
Figure 6:
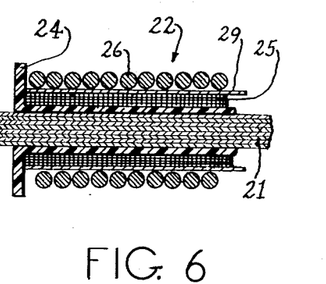

Figure 5 illustrates a transformer 20' which is equivalent to transformer 20, but in which core 21' may be comprised of one long lamination strip or ribbon wound into the bobbins 24 to build up the core.

The weight of core 21 of transformer 20 will be about 1/6 lb. Therefore, according to the previously given core loss table, when worked at 25,000 lines per square inch, the core loss will be, say, 0.01 watt. Considering that 25,000 lines flux density coincides with a voltage input of approximately 0.25 volt, the burden of, say, 0.01 watt is not too serious and permits working the core at 25,000 flux density, even with quite small design minimum load circuit current flow. Thus, in an ideal current transformer having no losses, the load could be matched to the transformer to work the core to 25,000 lines when 0.25 ampere flows in the load circuit, in which case the useful input to the transformer would be 0.25 by 0.25 or, say, 0.06 volt-amperes, or approximately 0.06 watt. In transformer 20, the load may be matched to the transformer to operate the core at 25,000 flux density, but, due to core loss alone, the useful input would be reduced to, say, 0.05 watt. The loss due to magnetizing turns is less serious, and all other losses in transformer 20 will be very minor. Referring again to the table, less than two ampere turns are required to magnetize the core of approximately 8" length, whereas at 0.25 ampere flow, there are 16 effective ampere turns in the primary winding. A useful input of, say, 0.04 watt is indicated at 0.25 ampere load circuit flow, and this is a significant input to the rectifier for providing the necessary holding energization of a small but rugged relay. At 0.50 ampere load circuit current flow, the core may be worked at or near 50,000 lines per sq. in. flux density, which is still in the high permeability range of "Hipernic" core material, which would result in a useful input of, say, 0.15 watt, which is significant power, even with respect to pull-in energization of a small but rugged relay.

With respect to obtaining a pull-in of the load relay under the condition of low frequency current in the load circuit, as will be described with respect to Figure 15, a still larger load circuit current flow is necessary for developing the necessary energy for the relay, and it may be desirable to use a compromise basis in matching the transformer and the load relay, as by using coarser wire for the relay operating coil.

Referring again to Figure 9, the elements of the load relay system 30 may be assembled conveniently on a frame or support 31. Transformer 20 is shown held horizontally by means of a clamp 33 which grips tightly the overlapping portions of core 21. Rectifier 32 may be a 25 volt 300 milliampere selenium rectifier, as suggested. Load relay 34 may be a conventional small D. C. relay of type suggested and, while the proper D. C. resistance of coil 35 of the load relay may be varied beneficially somewhat for different individual styles of relays or different adjustments of the same relay, a D. C. resistance of 300 ohms is suggested as ordinarily suitable with respect to the given specifications of the transformer and rectifier.

Relay 34 has a conventional armature 36, the usual armature spring 36', and is shown with a normally closed contact 37 and a normally open contact 38. A plastic or similar terminal strip 39 is attached to base 31 and has terminal screws 40 to accommodate the internal and external connections of the unit.

Figure 11 shows the wiring diagram of the unit 30, with typical external connections indicated. Four terminal screws 40 are allotted to the primary winding 26 of the transformer, to permit selection of series or parallel arrangement of the two sections of winding.

Figure 15:
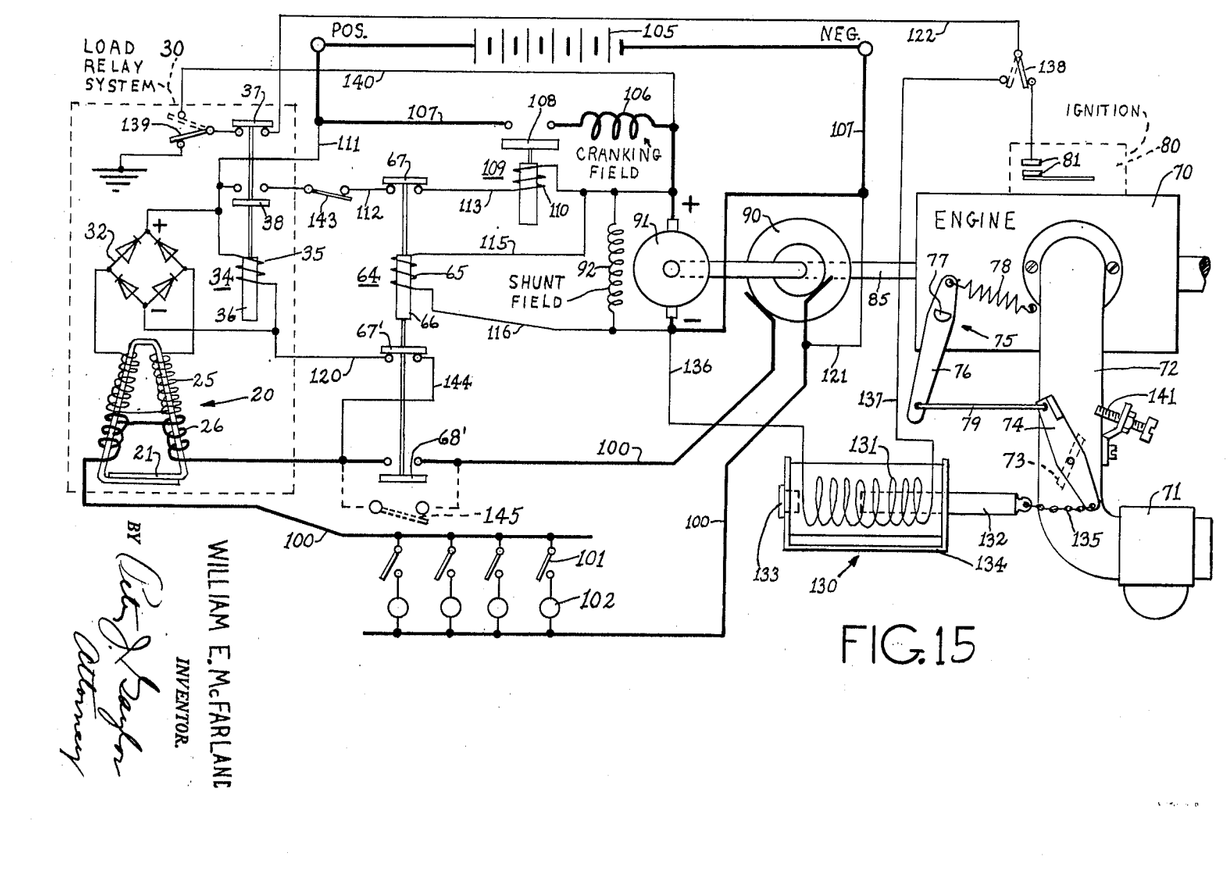
Figure 15 illustrates similarly a similar control system incorporating a further idling control improvement effected by the same load relay system.

A particular feature which may be observed in Figures 9 and 11 and which is further apparent from Figure 15 is that load relay 34 has only a single operating coil 35 and which is energizable by either the battery or through means of the transformer and rectifier, and no switching complications are necessary. Rectifier 32 is permanently connected to operating coil 35, and one side of the coil is permanently connected to one side of the battery. The external wiring connections of unit 30 are therefore as simple as those of the load relay systems used heretofore which did not include a current transformer and rectifier. It is necessary that the polarity of battery current applied to coil 35 be the same as the polarity of the rectifier, as shown. In Figures 9 and 11 the contacts 37 and 38 are shown in normal position indicating there is no flow in load circuit 100 and thus no energization of coil 35.

Figure 10:
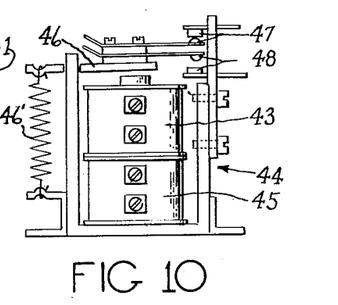
Figure 10 illustrates a side view of a modified form of relay coil useable in the system depicted in Figure 9.

Figure 10 indicates a modified form of load relay 44, useable for the present invention. This relay is more expensive and less efficient than the relay 34. Relay 44 has two separate operating coils 43 and 45 permitting entirely separate energization of the relay from either the starting battery or from the transformer 20. The armature 46, armature spring 46' and contacts 47 and 48 are similar to the corresponding parts in relay 34.

Figures 12 and 13 illustrate suitable types of relays for use in the speed-responsive switching systems of automatic start-stop control systems. The Figure 12 relay 54 is shown as a power relay having the single set of contacts 57, operating coil 55, armature 56 and armature spring 56'. Such a relay is suitable for closing the A. C. load circuit in electric plants of sufficient size to justify a separate relay for the purpose. The Figure 13 relay 64 indicates an ordinary D. C. voltage relay having operating coil 65, armature 66, armature spring 66', a normally closed set of contacts 67' and a normally open set of contacts 68'. Since Figure 13 is a side view, not all the contacts are shown in the drawing, and the relay in practice, will have additional contacts as needed, and may include a heavy duty contact for closing the load circuit in the event it is desirable to eliminate separate relay 12.

Figure 14:
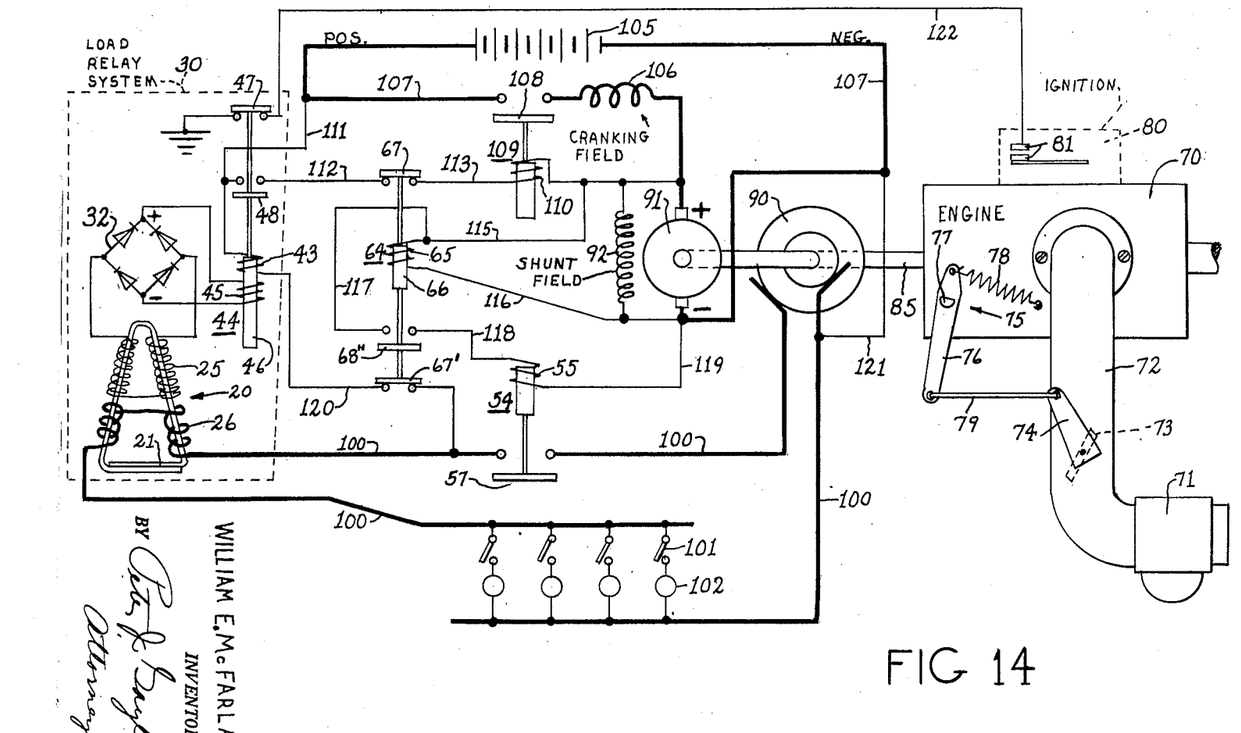
Figure 14 is a schematic flow and circuit diagram depicting a starting and stopping control system for an engine-generator plant embodying the load relay system of the present invention.

Figure 14 is a diagram showing the wiring and some other details of an electric plant equipped with an automatic start-stop control system employing the load relay system of the present invention. Certain usual details (which do not affect the design or basic operation of the load relay) such as an automatic choke and thermal protection against over-cranking, have been omitted for clarity. The relays are all indicated by a uniform type of symbol in Figure 14 and figures following.

In Figure 14 the load relay 44 of Figure 10 is shown employed, with the separate operating coils 43 and 45. The speed-responsive relay system comprises relays 54 and 64 which may be similar to those of Figures 12 and 13, respectively. For simplest illustration, a magneto-ignition engine is used, indicated generally by numeral 70. The engine has a fuel intake system comprising carburetor 71, intake pipe 72 and throttle valve 73. Throttle arm 74 enables controlling movement of the throttle valve. A mechanical speed governor is indicated generally as 75, and it has an operating arm or lever 76 mounted on the usual governor rocker shaft 77. The governor's centrifugal mechanism (which may be within the engine) is not illustrated. A link 79 connects governor arm 76 with throttle arm 74. The usual governor loading spring 78 urges governor arm 76 in the direction to increase the degree of throttle opening, which effect is opposed, as required, by the centrifugal mechanism, to maintain engine speed for generating current of the normal frequency (usually 60). The ignition system is indicated generally by the broken line enclosure 80 with the magneto breaker points of the ignition system indicated as 81. The ignition system is rendered ineffective and the engine stopped by grounding the points 81, as will be apparent from the succeeding discussion.

The generating components of the generator set are driven by the engine, as indicated schematically by means of shaft 85, and include a main or A. C. armature 90 which in the present instance may be assumed to have a 25 ampere rating, the D. C. or exciter armature 91, and a shunt field 92. No separate field is shown for the A. C. armature 90, since, in small plants, it is common practice to use the single shunt field 92 for both A. C. and D. C. generation.

The load generator 90 serves to power the load circuit 100. Connectable in the load circuit by switches 101 are the various load appliances 102 which may range in size from 1 or 2% of plant capacity to much larger. The load is served only if a switch 101 is closed and if also, the relay contact 57 is closed. Load current necessarily flows through the primary winding 26 of transformer 20.

Starting battery 105 is usually a 12 or 24 volt storage battery. A special cranking field 106 is indicated which is energized by battery current flow through the bold line cranking circuit 107 at such times as the contact 108 of a cranking relay 109 is closed. The field 106 co-operates with the D. C. armature 91 to provide a powerful motor for cranking the engine. The cranking relay includes an operating coil 110. The energization of cranking relay coil 110 is from battery 105 positive, wire 111, contacts 48 of load relay when closed, wire 112, relay contacts 67 when closed, wire 113, relay coil 110, through armature 91, and returning to battery negative.

The energization of coil 65 of the speed-responsive relay system is by shunt connection with exciter armature 91 through wires 115 and 116. Design of relay 64 is such that armature 66 will be operatively energized to perform the switching operation only when the engine speed has come up sufficiently that the voltage generated by armature 91 is fairly near normal running voltage. Thus the indicated contact positions of relay 64 will hold until the engine has been started and acceleration has occurred. Energization of operating coil 55 of relay 54 will occur simultaneously with the reversal of the illustrated position of relay 64. The circuit for energizing coil 55 is from positive terminal of exciter armature 91, wire 115, wire 117, relay contact 68" when closed, wire 118, coil 55 and wire 119 to negative exciter terminal.

The operating coil 43 of load relay 44 is battery energized, the circuit from battery 105 positive being through wire 111, coil 43, wire 120, normally closed relay contact 67', a portion of the load circuit 100, transformer primary winding 26, on through load circuit 100, wire 121 and cranking circuit 107 to battery negative.

The engine is stopped through control action of the load relay 44 by means of a ground connection which includes the wire 122, the contact 47 when closed, and ground.

The following is the sequence of operation for the system depicted in Figure 14. Assuming the plant to be stopped and all load switches 101 open, the relay positions will be as shown and throttle 73 will be open as shown. Closing of one switch 101 completes the above described circuit for energizing load relay coil 43. This may be termed the first circuit, and results in energizing relay armature 46 to open contact 47 and close contact 48. Ignition system 80 is thus rendered effective and the second battery circuit completed, which is that described above for energizing coil 110 of cranking relay 109. This action, in turn, closes contact 108 to establish the third, or cranking circuit, and the engine is revolved and starts firing. As the engine picks up speed, exciter armature 91 begins to generate D. C. and, at a certain point, cranking contact 108 will open since relay coil 110 is momentarily between two equal and opposing voltages.

As the engine continues to accelerate under its own power, the voltage of exciter armature 91 rises toward normal, acting through relay coil 65 to energize armature 66 of the speed-responsive relay 64 and effecting reversal of the shown contact positions. The contact 67 opens preventing further current flow through relay coil 110. Contact 67' opens interrupting the battery energization of relay coil 43. Contact 68" closes, effecting immediate energization of relay coil 55 and closing of the main load circuit contact 57, thus completing the running circuit. Coil 45 of the load relay becomes effectively energized (and thus the contact 47 is held open) through action of transformer 20 and rectifier 32. There is a slight interval between the opening or breaking of contact 67' and the closing or making of contact 57 in which neither coil 43 nor coil 45 of the load relay has any energization. This is not serious. As one reason, in the load relay system, as arranged herein, the contacts of the load relay will hold their status during a brief switching interval. As another, if the magneto ground contact 47 did close momentarily during the switchover period, it would not cause appreciable slow down of the engine, as the action of the load relay in the system herein is powerful and contact 47 would be re-opened immediately upon closing of contact 57, and even a small load circuit flow begins. In the case of the directly energized current relays used as load relays heretofore it was often found necessary to use a special design and adjustment of the speed responsive relay to permit an overlapping of the battery energization and A. C. energization of the load relay, this being necessary because of the inherently weak action of the load relays used heretofore.

At such time as all loads are taken off the load circuit 100, load relay 44 will necessarily become de-energized and drop out. Thus, it will close its contact 47 and will render effective the means for stopping the engine which in Figure 14 is the magneto ground connection. All relays then will revert to the illustrated positions.

Figure 15 is a diagram similar to Figure 14 but illustrating the use of the more efficient load relay 34. It also illustrates another particular feature of the present invention, that of an automatic start-stop control system combined with an automatic idling control system, with manually selective switching, so that the electric plant can be operated in several different ways including one manner whereby the plant is automatically started when the first load is thrown on the line and, thereafter, operates alternately at load speed or slow (idling) speed, in accordance with initiation or termination of load circuit current flow.

The idling control system includes an electromagnet 130 which has an operating winding 131, a plunger 132, a fixed core or stop 133, and a main frame 134. A chain 135 connects the plunger 132 with the throttle arm 74. The winding 131 is energized from the exciter armature 91, by a circuit including wire 136, winding 131, wire 137, manual switch 138 (when in the broken line position), wire 122, load relay contact 37 (when closed), switch 139 (when in the broken line position), and wire 140. Plunger 132 will exert a pull on chain 135 to oppose the action of governor 75 and reduce engine speed for such periods during which winding 131 is energized.

In Figure 15 the separate relay 54 for closing the load circuit is unnecessary and has been omitted. The same function is taken over by the normally open contact 68' of the regular speed-responsive relay 64.

The operation of the Figure 15 structure is as follows. Positions of the elements are those of a stopped plant, with no load connected, and manual switches 138 and 139 in the solid line position. Closing of any load switch 101 will complete the first battery circuit from battery 105 positive, through wire 111, the single coil 35 of the load relay 34, normally closed contact 67', wire 144, transformer primary winding 26, load appliance 102, wire 121, and completing the circuit to battery negative. As in Figure 14, the first circuit accomplishes the reversal of the positions of the load relay contacts 37 and 38 from the positions shown, to relieve the magneto ground and to effect closing of contact 108 and cranking of the engine as described for Figure 14. Manual switch 143 is ordinarily left closed, as shown. When the engine has accelerated sufficiently, the shown positions for relay 64 will be reversed. Thus, contact 67' will be opened and practically simultaneously, contact 68' will be closed to complete the running circuit. The transformer energization of load relay coil 35 becomes effective almost simultaneously with the termination of the battery circuit energization, and the relay 34 will in positive manner hold the proper status of control during the slight switchover interval. When all loads 102 are taken off the line, contacts 37 will close to effect stopping of the engine. For the above-described operation, idling electromagnet 130 is not energized, and speed governor 75 is in full control of fuel regulation until the engine is stopped.

Especially for certain applications, such as the operation of contractors' tools powered by the electric plant, it may be desirable that the plant continue to run after the first power demand has ceased. This is especially so if there can be a sensitive control arrangement so that the engine runs at reduced speed except for periods of actual power demand. Such a need is fulfilled by the system depicted in Figure 15 wherein manual switches 138 and 139 are thrown in the broken line position to prepare the system for the energization of winding 131 of the idling system.

Figure 17:
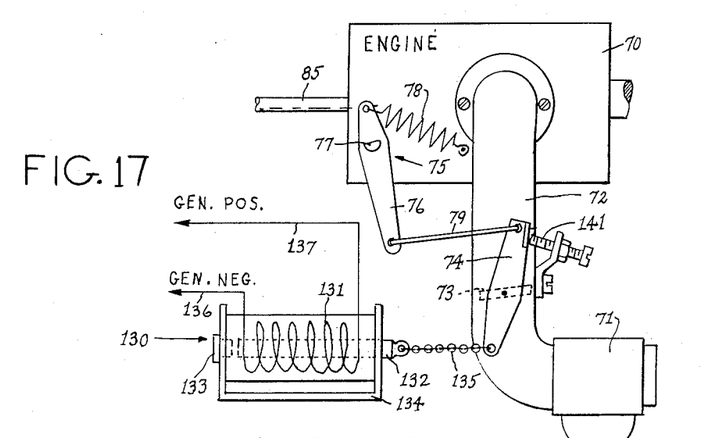
Figure 17 illustrates a portion of the engine and idling control system of Figure 15 with the solenoid in energized condition.

When a load switch 101 is closed for the first power demand, the engine will be started and the load will be served as heretofore described, but the engine will not be stopped at disconnection of load, as the magneto ground circuit for stopping the engine now is ineffective due to the position of switches 138 and 139. When all loads 102 are disconnected, load relay contact 37 will close. This completes the energization circuit of winding 131, resulting in strong energization of the winding with current from D. C. armature 91, and plunger 132 is pulled inwardly to or closely toward fixed core 133, and throttle arm 74 will be forced against stop 141, thus closing the throttle to the selected idling limit, and the engine will slow down. The positions of the idling electromagnet plunger 132 and of the fuel intake system elements during idling condition are shown in Figure 17.

As the engine slows down toward its final idling speed, winding 131 will be more weakly energized, but plunger 132 is positioned at least near fixed stop 133, so that relatively little energization is required to hold the throttle suitably closed against the effort of governor loading spring 78 to open the throttle.

The idling speed of the engine need not be so slow that speed-responsive relay 64 will fail to hold its energized status and thus the positions of contacts 67, 67' and 68' can remain as they were when running speed was effective, that is, reversed in position with respect to those shown in Figure 15. During this idling period, when a load switch 101 is next closed, there immediately will be a flow of (low frequency) current through load circuit 100 without need for a switching operation. The AC voltage being generated at this initial stage will be low, but the load appliance is usually of a type which draws a high surge current such as a current of 1 ampere or more, which is sufficient, through action of transformer 20 and rectifier 32, to energize operating winding 35 of the load relay with rather slow D. C. pulsations. These are efficient in initially energizing armature 36 to accomplish the opening of contact 37 which will result in de-energization of idling electromagnet winding 131 and permit main governor 75 to again control the engine for full speed operation. The load relay system and idling electromagnet 130, therefore, represent the elements of an idling device employing a saturated transformer, the operation and features of which are described in detail in co-pending application Serial No. 533,128, filed September 8, 1955, by William E. McFarland.

Under some conditions of design or adjustment, the engine speed could drop so low that speed-responsive relay 64 would not hold its energized status when idling speed operation was in effect. The contact positions of this relay then would reverse to those illustrated in Figure 15. In such an instance, when a load switch 101 is next closed, battery current will flow through operating winding 35 of the load relay. This, however, will assure the desired opening of load relay contacts 37 and, upon sufficient acceleration, speed-responsive relay 64 will again reverse its contact positions and the normal running circuit again will be completed. This latter operation has certain advantages in that load relay system 30 can perform in fully sensitive manner since it is not required to deal with the low frequency current; and, in addition, the A. C. load circuit is not closed until the engine has its normal speed and power which provide better performance when load 102 is a large A. C. motor, and especially one which drives loads which are best started by a quick spin, such as compressor loads.

In the last described operation, however, cranking circuit control contact 38 closes at each new initiation of load, thus closing the energization circuit for coil 110 of the cranking relay. Exciter armature 91 is, however, generating some voltage at idling speed which partially opposes the battery energization of coil 110, and the design or adjustment of relay 109 may be such that it does not close contact 108 so long as armature 91 supplies a little opposing voltage. In addition, there is no great harm in the particular cranking system shown in Figure 15 if cranking contact 108 does close momentarily, except for the disadvantage of some drain on the starting battery. Also, in Figure 15, a manual switch 143 is shown, which can be manually opened after the engine is started and which will insure against cranking effort even if the engine runs out of fuel.

At times, it may be desired to use the electric plant of Figure 15 as a portable hand-cranked plant. Starting battery 105 then may be disconnected from the plant at the positive and negative terminals, and the optional manual switch 145 closed, with switches 138 and 139 thrown in the broken line positions and switch 143 open. The cranking system and speed-responsive relay 64 will have no further effect or function, but load relay system 30, together with idling electromagnet 130, will operate efficiently as an idling device.

Figure 18:
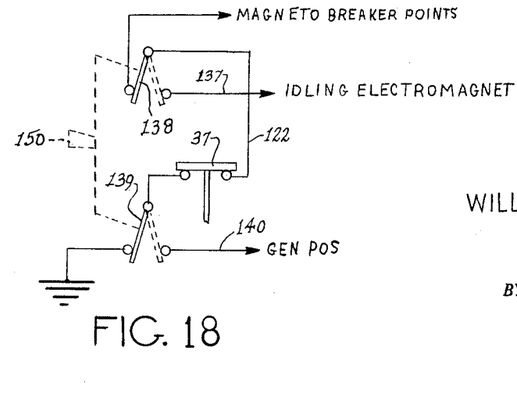
Figure 18 is a modification of the control switch portion of the circuit depicted in Figure 15. Similar numerals refer to similar parts in the various figures.

Figure 18 is a diagram indicating that switches 138 and 139 may be arranged to be operated by a common handle or lever 150 to simplify selection of the plant for operation as an automatic start-stop system of control or as an automatic idling system of control.

Figure 16:
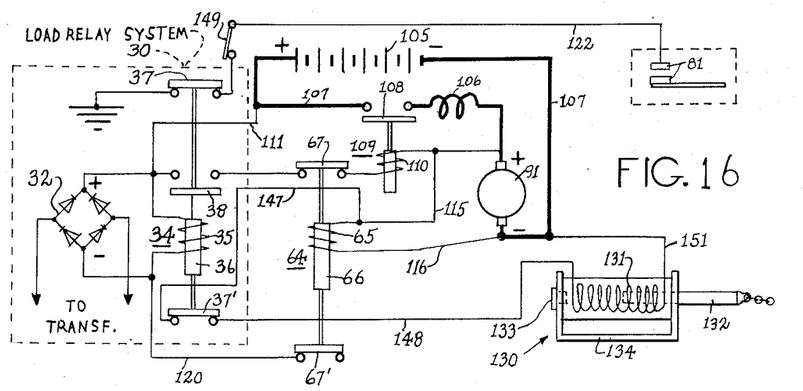

Figure 16 is a diagram similar to Figure 15, but omitting some of the elements which would be the same in either figure. In Figure 16, an additional contact 37' is included in load relay 34. This contact is of the normally-closed type, and is used specifically to control the energization of idling electromagnet winding 131 through a circuit which includes wires 115, 147, contact 37', wire 148, coil 131 and wire 151. A manual switch 149 is in series with the magneto ground wire 122. With switch 149 closed, the engine will be stopped automatically at each termination of load circuit current flow. With switch 149 open, the plant automatically will start when the first load switch 101 is closed and thereafter, upon disconnection of load, operate at slow idling speed except when loads are connected. The operation, in general, is therefore equivalent to that of Figure 15.

Although the present discussion and drawings have been more or less limited to the use of a single relay in the load relay system, which is at one phase battery-energized and, at another phase, transformer energized, it is to be understood that this invention is not to be limited to load relay systems incorporating only one relay. In some systems, an independent relay may be employed specifically for the battery energization phase, and another separate relay, such as a transformer-energized relay may be employed for the other energization phase.

I claim:

1. In an automatic start-stop control system for an internal combustion engine-driven generator set including an A. C. generator serving as an energization source for at least one connectable-disconnectable load in a load circuit, a governor for regulating the engine fuel under load condition, cranking means including a battery as an energization source for starting the engine, stopping means for stopping the engine by an engine-stopping switching operation of the hereinafter-mentioned load relay system, said control system also including a hereinafter-mentioned speed-responsive relay system for providing the hereinafter-mentioned transfer switching after starting of the engine, the improvement comprising said speed-responsive relay system including normally-open contacts and normally-closed contacts, a load relay system including an electromagnetic switching relay, a rectifier and a current transformer, said electromagnetic switching relay including an operating winding constructed and arranged, upon energization thereof, to effect an engine-starting switching action to control said cranking means so as to start the engine while rendering said stopping means ineffective, and including an operating winding which may be the aforesaid operating winding and which, upon energization, is constructed and arranged to act upon said stopping means to hold it ineffective and thereby enable continuous operation of the engine, said electromagnetic switching relay being constructed and arranged so that, upon cessation of energization of any operating winding, the aforesaid engine-stopping switching operation is effected to stop the engine, one operating winding which may be the only operating winding of said electromagnetic switching relay being connected in series with the battery and the load circuit and with the normally-closed contacts of the speed-responsive relay system in a manner so that when a load is connected initially in the load circuit, said one operating winding becomes battery-energized to effect said starting of the engine, said speed-responsive relay system being constructed and arranged to effect said transfer-switching by opening said normally-closed contacts when the engine approaches governed speed, thereby terminating said battery energization of said one operating winding, and, at the same time, closing said normally-open contacts, thereby connecting the A. C. generator with the load circuit, said transformer having its primary winding connected in series with the load circuit and having its secondary winding arranged to feed current through said rectifier into said second-mentioned operating winding holding said stopping means ineffective and hold said latter winding energized until termination of load circuit current flow, said transformer being constructed and arranged to operate at high saturation and provide an adequate, constant, energy level output to the winding which it energizes, under variable load condition.

2. An automatic start-stop control system according to claim 1 in which the switching relay is a small, rugged D. C. relay.

3. An automatic start-stop control system according to claim 2 in which the transformer has a core of small cross-sectional area and is made of material having high permeability extending at least relatively high in its magnetization range, and in which the rectifier is a bridge-circuit rectifier, and in which the operating winding holding the stopping means ineffective has a high impedance with respect to the transformer, whereby the core is operated at least relatively high in the magnetization range even when small A. C. flows in the load circuit whereupon the transformer is enabled to obtain a significant voltage input, and said core is operated at saturation when large A. C. flows in the load circuit whereby over-energization of the operating winding is prevented.

4. An automatic start-stop control system according to claim 1 in which the transformer has a core of small cross-sectional area, made of laminations of high permeability material.

5. An automatic start-stop control system according to claim 1 in which the electromagnetic switching relay is a conventional small relay having a common operating winding energized by either said battery or said transformer, said winding being connected in series with the battery and the load circuit when said normally-closed contacts of the speed-responsive relay system are closed, thereby enabling battery energization of said common winding upon initial connection of load so as to start the engine while rendering the stopping means ineffective, said common winding also being connected to the rectifier whereby the current from the transformer secondary winding is made to hold energized said common winding and thereby hold ineffective said stopping means, after said normally-closed contacts are opened to terminate said battery energization.

6. An automatic start-stop control system according to claim 5 in which said common operating winding is permanently connected to the rectifier, and in which the polarity of the battery connection to said common winding is the same as that of the rectifier connection.

7. An automatic start-stop control system according to claim 1 which also includes an idling electromagnet energizable through switching action of the load relay system and constructed and arranged to act upon the engine governor at a status of energization or de-energization of said electromagnet to effect a lowered engine speed, for idling, and a manually-operable selective switching control whereby, at one position of said switching control, the means for stopping the engine is made ineffective, and the other status of energization or de-energization of said electromagnet is provided upon cessation of energization of any operating winding whereby lowered idling speed is effective when the load circuit is opened.

8. An automatic start-stop control system according to claim 7 in which the engine has a spark ignition system and a ground connection therefor and in which said switching relay includes normally-closed contacts which are closed upon cessation of operating winding energization, and in which said manually-operable switching control in one position places said normally-closed contacts in series with the engine ignition system and ground to stop the engine, and, in another position, places said normally-closed contacts in series with said idling electromagnet and an energization source, to energize said electromagnet so as to act upon said governor to effect a lowered engine speed.

9. An automatic start-stop control system according to claim 1 in which the switching relay is a relay having two operating windings one of which is a battery-fed winding connected in series with the battery and the load circuit when said normally-closed contacts of the speed-responsive relay system are closed, thereby enabling battery energization of said latter winding upon initial connection of load so as to start the engine while rendering the stopping means ineffective, and the other operating winding is a transformer-fed winding connected to the rectifier whereby the current from the transformer secondary winding is made to hold said transformer-fed winding energized after said normally-closed contact is opened to terminate said battery energization and thereby hold ineffective said stopping means.

References Cited in the file of this patent

UNITED STATES PATENTS

| | | |
|---|---|---|
| 1,704,996 | Witzel | Mar. 12, 1929 |
| 1,866,498 | Strong | July 5, 1932 |
| 2,611,877 | Walters | Sept. 23, 1952 |
| 2,762,933 | Foxcroft | Sept. 11, 1956 |